(12) United States Patent
Wei et al.

(10) Patent No.: US 8,218,483 B2
(45) Date of Patent: Jul. 10, 2012

(54) METHOD FOR TRANSMITTING DATA PACKETS USING DIFFERENT FREQUENCY REUSE FACTORS

(75) Inventors: Xusheng Wei, Edinburgh (GB); Timothy J. W. Moulsley, Caterham (GB)

(73) Assignees: Koninklijke Philips Electronics N.V, Eindhoven (NL); Sharp Corporation, Osaka (JP)

( * ) Notice: Subject to any disclaimer, the term of this patent is extended or adjusted under 35 U.S.C. 154(b) by 535 days.

(21) Appl. No.: 12/447,531

(22) PCT Filed: Oct. 30, 2007

(86) PCT No.: PCT/IB2007/054402
§ 371 (c)(1),
(2), (4) Date: Apr. 28, 2009

(87) PCT Pub. No.: WO2008/053429
PCT Pub. Date: May 8, 2008

(65) Prior Publication Data
US 2010/0061297 A1   Mar. 11, 2010

(30) Foreign Application Priority Data
Oct. 31, 2006   (EP) ..................................... 06301107

(51) Int. Cl.
*H04L 12/56* (2006.01)
*H04L 12/26* (2006.01)
*H04W 40/04* (2009.01)
(52) U.S. Cl. ........ 370/328; 370/329; 370/331; 370/338; 370/432; 455/447
(58) Field of Classification Search .......... 370/200–432; 455/446–524
See application file for complete search history.

(56) References Cited

U.S. PATENT DOCUMENTS

| | | | |
|---|---|---|---|
| 6,137,787 A * | 10/2000 | Chawla et al. | ................ 370/337 |
| 2002/0075893 A1 | 6/2002 | Gipson et al. | |
| 2005/0197129 A1 * | 9/2005 | Cho et al. | ...................... 455/447 |

* cited by examiner

*Primary Examiner* — Afsar M. Qureshi

(57) ABSTRACT

A method and device for transmitting a data signal including a plurality of data packets from a base station to a radio device that perform acts of subdividing each data packet into at least a first data sub-packet and a second data sub-packet; transmitting simultaneously the first data sub-packet on a first portion of total resources, having a first reuse frequency factor, and the second data sub-packet on at least one second portion of total resources having second reuse factor, said first reuse factor being different from said second reuse factor.

22 Claims, 3 Drawing Sheets

METHOD FOR TRANSMITTING DATA PACKETS USING DIFFERENT FREQUENCY REUSE FACTORS

FIELD OF THE INVENTION

This invention relates to a method for transmitting a radio signal, in particular a broadcast or a control channel signal, to a base station, a radio station and a system using this method.

BACKGROUND OF THE INVENTION

For mobile communication systems such as GSM, in each cell is allocated a group of frequency resources, and in adjacent cells are assigned frequency resource groups which are completely different from those of the neighbouring cells. The base station antenna of a cell is designed to achieve desired coverage within this particular cell. By limiting the boundaries of the coverage area within one cell, the same group of frequency resources can be used by other cells that are sufficiently separated from one another to keep the interference level within pre-defined limits. The design process of selecting and allocating frequency resources to cells within the desired coverage area is called frequency reuse (or frequency planning).

Currently, several schemes of frequency reuse such as semi-static and fractional frequency reuse are proposed for the Long Term Evolution of UMTS. The main idea is to divide whole frequency resources into several different sub-carrier groups. The cell centre users of every cell use the same sub-carrier group whereas the cell edge users use approximately orthogonal sub-carrier groups. Hence, different frequency reuse factors can be generated according to the user's location. The Signal to Interference Ratio of the cell edge users is increased while the spectral efficiency and data rate discrepancies between cell edge and cell centre users are minimized.

The semi-static frequency reuse scheme takes the traffic load at the cell edge into account. However, the allocation of the frequency resource requires a centralized scheduler. In the fractional frequency reuse scheme, a user can be treated as a cell edge or a cell centre user depending on its CQI feedback. Moreover, the proposed frequency reuse schemes, such as semi-static or fractional frequency reuse schemes, focus on the data channel, for which it is possible to make use of feedback to control the allocation of subcarriers.

SUMMARY OF THE INVENTION

It is therefore an object of the present invention to provide a communication scheme having an improved throughput.

Another object of the invention is to provide a communication scheme using a resource reuse factor that can be adapted for signalling or broadcast channels.

According to a first aspect of the invention, there is provided a method for transmitting a data signal including a plurality of data packets from a base station to a radio device, said method comprising:
subdividing each data packet into at least a first data sub-packet and a second data sub-packet;
transmitting the first data sub-packet on a first portion of total resources, having a first reuse factor, and the second data sub-packet on at least one second portion of total resources having a second reuse factor, said first reuse factor being different from said second reuse factor.

According to another aspect of the invention, there is provided a method for receiving a data signal including at least one data packet at a radio device, said method comprising: receiving a first data sub packet on a first portion of total resources having a first reuse factor, receiving a second data sub packet on a second portion of total resources, said second portion of total resources having a second reuse factor, said first reuse factor being different from said second reuse factor; combining the first and second data sub-packets into a data packet.

According to still another aspect of the invention, there is provided a base station for transmitting a data signal including at least one data packet comprising means for subdividing each data packet into at least a first data sub-packet and a second data sub-packet; a first transmitter for transmitting the first data sub-packet on a first portion of total resources, having a first reuse factor, and a second transmitter for transmitting the second data sub-packet on at least one second portion of total resources having second reuse factor, said first reuse factor being different from said second reuse factor.

According to another aspect of the invention, there is provided a radio device, for receiving a data signal including at least one data packet from a base station in a network, said radio device comprising means for receiving signals a first signal including a first sub-packet on a first resource portion, said first resource portion having a first reuse factor, means for receiving signals a second signal including a second sub-packet on a second resource portion, said second resource portion having a second reuse factor, the first reuse factor being different from the second reuse factor.

It has been shown that by using such a hybrid reuse communication scheme that the spectral efficiency is improved, without requiring a feedback loop. Then, this scheme may be employed for channels like signalling channel or control channel, having no simple feedback means.

According to an advantageous variant of the present invention, the method of transmitting a data signal further comprises the step consisting of coding the data signal before subdividing into data packets.

BRIEF DESCRIPTION OF THE DRAWINGS

The invention will now be described, by way of example, with reference to the accompanying drawings wherein.

DETAILED DESCRIPTION

The present invention will be described in relation to a UMTS, by way of example. In such a system, downlink signals are transmitted from a base station (BS) to a radio device being a mobile station (MS). According to an aspect of the invention, the base station transmits a data signal by using a hybrid reuse scheme. This reuse scheme is a frequency reuse scheme, where two different reuse schemes with different reuse frequency factors are combined to increase the throughput of the link. But, in some variants of the invention, the reuse schemes may be based on timeslots (for instance for a TDMA communication), or on codes (for instance for a CDMA communication).

More specifically, the frequency reuse schemes may use groups of sub-carriers that are normally allocated to neighbouring cells. The total available frequency resource may be divided into two groups. In fact, the proposed hybrid frequency reuse scheme imposes a weighting factor between the bandwidths of frequency group RF1, having for instance a single bandwidth A, and the group of frequencies RF2, which corresponds to the summation of bandwidths B, C and D. The weighting factor is chosen so that it provides the maximum normalized throughput (or spectral efficiency). For instance, a factor $\beta$ is chosen so that it makes $T=\beta T_1+(1-\beta)T_2$ as close to the maximum of $T_1$ and $T_2$, where $T_1$ is the link spectral efficiency of the first total resource portion, here the group of frequencies RF1, and $T_2$ being the link spectral efficiency of the second total resource portion, here the group of frequencies RF2. As it will be described in more detail, it is particularly advantageous to have $\beta$ in the range of 0.4 to 0.6, and preferably 0.5.

In one example, the group of frequencies RF1 has a reuse factor of 1, and the group of frequencies has a reuse factor of 3. These values correspond to the fact that usually, three different groups of sub-carriers are used in UMTS for the different adjacent cells. However, since this invention may be adapted to other systems, these values may be adapted to each system of communication.

Figure 1A:
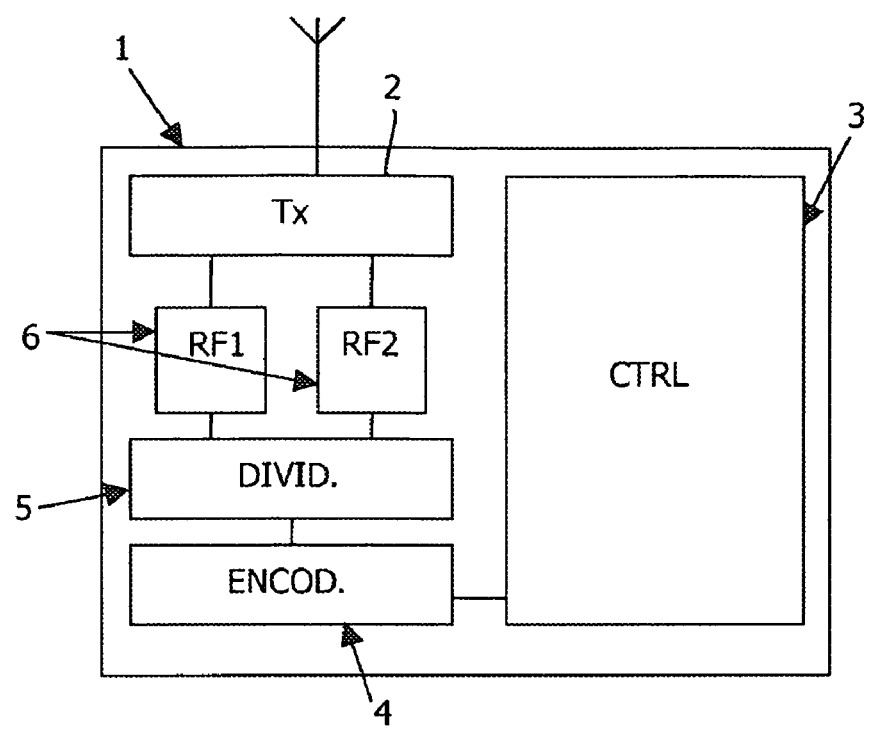
FIGS. 1A and 1B are block diagrams representing schematically respectively a base station and a radio device in accordance with an embodiment of the invention.

As depicted on FIG. 1A, a base station 1 in conformity with an embodiment of the invention comprises a RF transmitter 2 (Tx) and a controller 3. Moreover, the base station 1 may comprise an encoder 4, which encodes a signal forming signal packets to be transmitted. The encoder 4 outputs the signal packets to a subdividing device 5, which divides the signal packets in sub packets for distributing sub-packets to for example two modulators 6. Each modulator corresponds to one reuse frequency scheme, with its corresponding group of frequencies RF1 or RF2.

Thus, when the packets of the signal are subdivided into sub-packets by the subdividing device 5, the sub-packets of one packet are modulated by the modulators 6 according to a respective reuse frequency scheme, and then transmitted by the transmitter 2. The sub packets may be transmitted simultaneously. However, in a variant of the invention, the sub-packets are transmitted at different times, for instance adjacently, and subsequently from each other. It is also possible to transmit the sub packets in successive different sub frames.

Sub-packets sent on RF1 may be transmitted at a first predetermined power level, and sub-packets sent on RF2 may be transmitted at a second predetermined power level. As indicated before, the power levels are chosen so that the global link spectral efficiency equals $T=\beta T_1+(1-\beta)T_2$, with $\beta$ comprised between 0.4 and 0.6, and preferably 0.5.

Alternatively, the first and the second sizes are chosen so that the global link spectral efficiency equals $T=\beta T_1+(1-\beta)T_2$.

This permits to obtain a spectral efficiency at least as good as a conventional frequency reuse scheme with a reuse factor of 3.

Since there is no use of a feedback loop, the factor being predetermined, this embodiment of the invention is not limited to the data channel. Indeed, the data signal may be a broadcast channel signal, a signalling channel signal, a control channel, or a multicast signal, for which no feedback signal is available from the mobile stations.

Figure 1B:
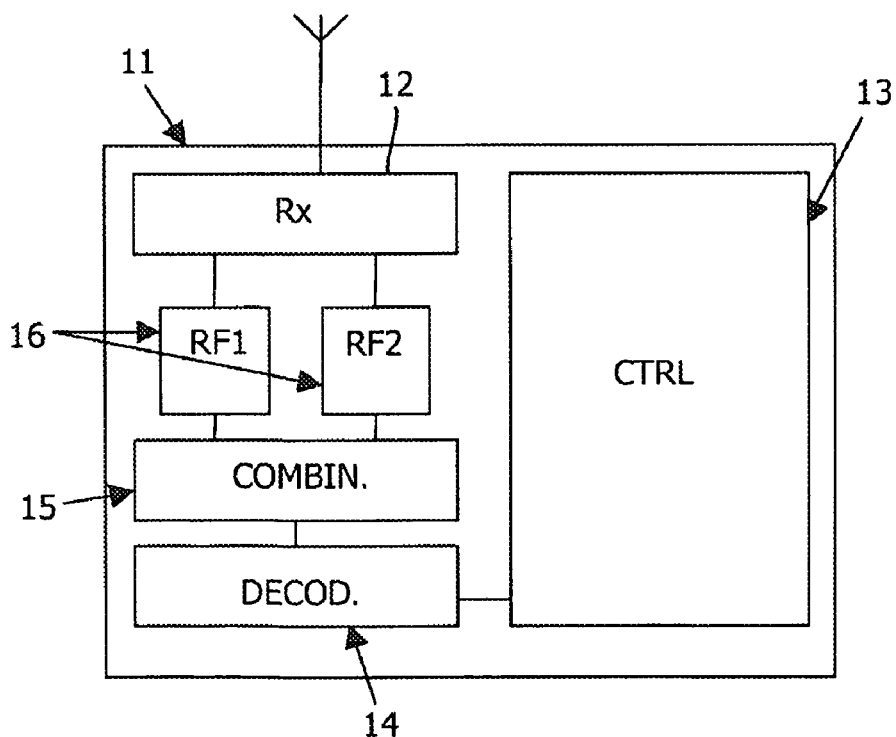

As illustrated on FIG. 1B, a mobile station 11 in conformity with the embodiment of the invention comprises a receiver 12 (Rx) and a controller 13. The receiver 12 provides the signal received to for example two demodulators 16. Each demodulator corresponds to one frequency reuse scheme, with its corresponding group of frequencies RF1 or RF2. The demodulators 6 are connected to a recombining device 15, which combines the sub-packets previously demodulated by the demodulators 6, for forming data packets. A decoder 14 receives the data packets from the recombining device 15, decodes them, and outputs the reconstructed signal. If the sub packets were transmitted at different times, a buffer can be used for recombining the sub packets into data packets.

In this embodiment, the mobile station monitors continuously all the different groups of frequencies corresponding to the combined reuse schemes. The signal is thus distributed on the different group of frequencies, enabling to use in a more efficient manner the frequency resources.

In order to inform the mobile station of the pattern of the reuse schemes utilized by the base station, it is possible to send a resource partition pattern information, describing the frequencies and/or the levels of the groups RF1 and RF2 to find the control channel for instance on in each cell. Therefore in a variant of this embodiment, the proposed hybrid scheme could be applicable to a P-BCH (primary broadcast channel), with the pattern of subcarriers used in each cell being deduced from other explicit or implicit signalling—for example from pilot patterns or synchronisation channel sequences. In another variant, the invention could be applied to a S-BCH (secondary broadcast channel), with the pattern of subcarriers used in each cell being signalled on a P-BCH. The proposed invention could also be applied to a downlink control channel, especially if the downlink control channel carried information (possibly jointly coded) for more than one user, so that the feedback information from individual users would not be applicable for selecting the frequency allocation of the control channel.

According to this embodiment, the signal is coded before being subdivided by the encoder 4, and decoded by the decoder 14 after the recombination. This permits to obtain a better signal global quality. Indeed, if the signal received on one of the frequency group, for instance RF1 is of a good quality, but the signal received on the other frequency group RF2 is of bad quality, decoding after recombination permits to compensate the bad quality of RF2 group signal when outputting the decoded signal.

Figure 2A:
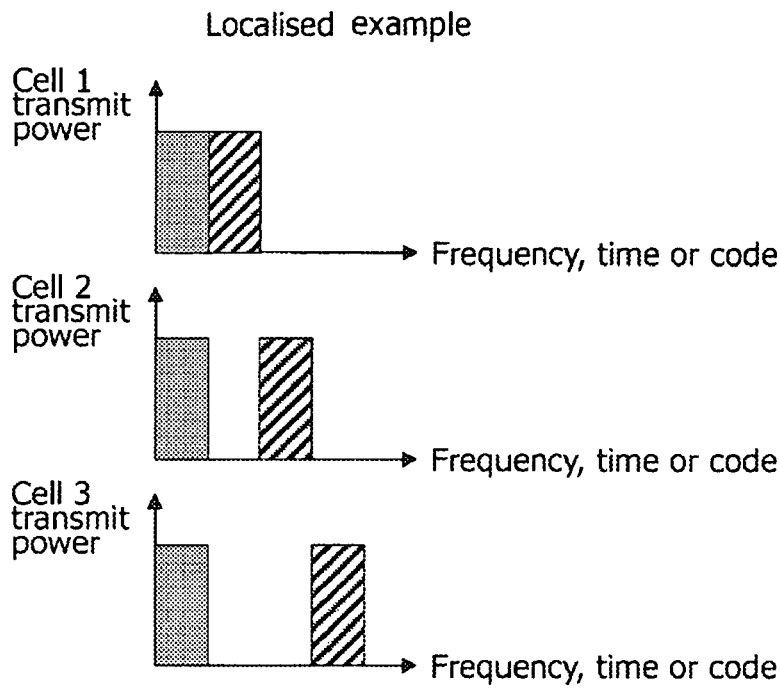
FIGS. 2A, 2B are graphics representing the spectrum of the signal according to variants of the invention.
Figure 2B:
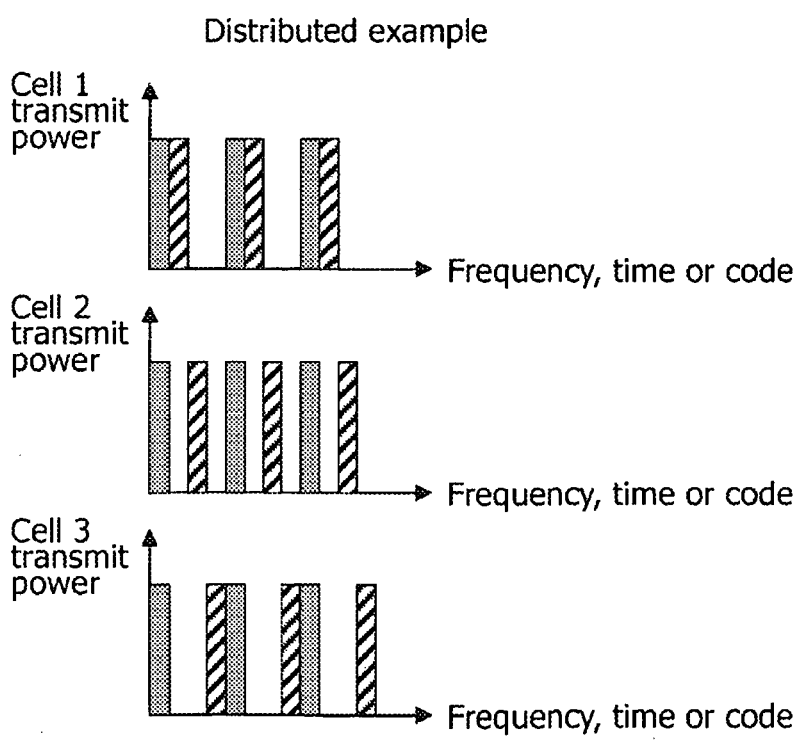

In a first variant of the invention, each portion of total resources is contiguous, as illustrated on FIG. 2A. Indeed, each group of frequencies F1, corresponding to the RF1 group, and F2 and F3, corresponding to the RF2 group are localized and contiguous. According to another variant of the invention, each portion of total resources may be distributed and non-contiguous as illustrated on FIG. 2B. Indeed, the groups of frequencies F1, F2, and F3 are interleaved.

As explained above, sub-packets sent on RF1 are transmitted at a first predetermined power level, and sub-packets sent on RF2 are transmitted at a second predetermined power level, the power levels being chosen so that the global link spectral efficiency equals $T=\beta T_1+(1-\beta)T_2$, with $\beta$ comprised between 0.4 and 0.6, and preferably 0.5.

Figure 3:
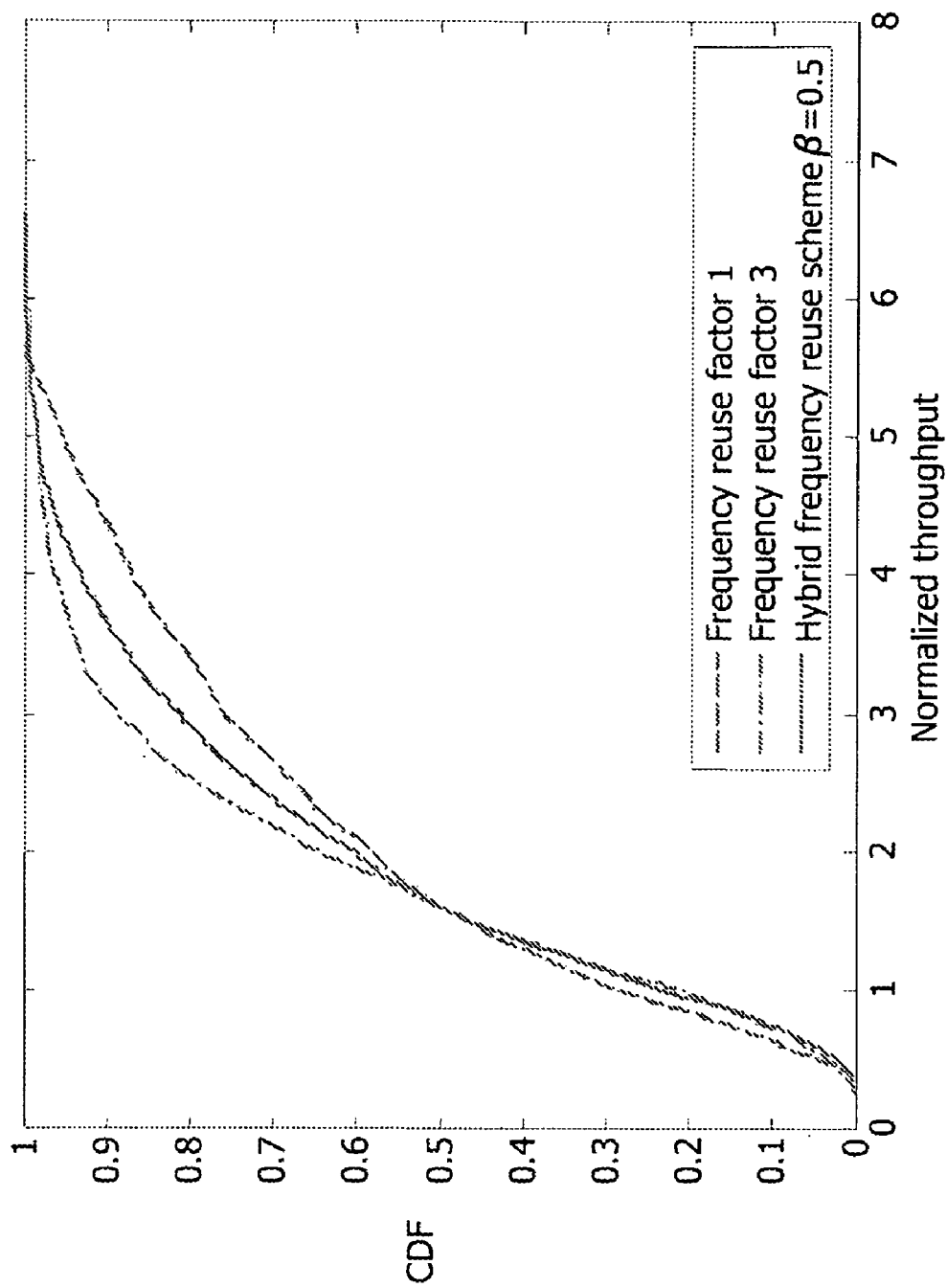
FIG. 3 is a graphic representing a comparison of an embodiment of the invention with classical schemes of communication.

As illustrated on FIG. 3, a comparison between the known schemes and an embodiment of the invention with this value of weighting factor of 0.5. In order to make a fair comparison between known schemes and the invention, the performance of frequency reuse schemes is considered under the criterion of maximizing the normalized throughput (or spectral efficiency).

Intuitively, since the signal to noise ratio achieved by frequency reuse scheme with factor 3 is higher than that achieved by frequency reuse scheme with factor 1 due to the higher transmission power and lower inter-cell interference, terminals would prefer to use only the frequency group with reuse factor 3. However, the normalized throughput (link spectral efficiency) of the frequency reuse scheme with factor 3 may be not larger any more (the normalized throughput is obtained by dividing the throughput by the product of the utilised bandwidth and the reuse factor). Assuming the normalized throughput for schemes with frequency reuse factor 1 and 3 are $T_1$, and $T_3$ respectively, the maximum normalized throughput can be achieved by selecting the maximum between $T_1$ and $T_3$. However, this is not practical for the control channel since feedback information is required in order to make such a selection.

This method makes the performance of the cell-edge users slightly better or as good as users with pure frequency reuse factor 3, while the cell-centre performance is significantly better than reuse factor 3. This can therefore translate into a reduced transmission power requirement for the control channel to cover the whole cell.

As illustrated on the graphic of FIG. 3, it can be seen that at the 5-percentile point which is relevant when considering cell-edge performance, there is 6.5% improvement in normalized throughput compared with that of the frequency reuse 3 scheme. This makes the cell-edge performance as good as the reuse factor 3, while the cell-centre performance is better than reuse factor 3. This can therefore translate into a reduced transmission power requirement for the control channel to cover the whole cell.

Although the invention has been described primarily in relation to transmissions from base stations to mobile terminals, the invention is also applicable to transmissions from mobile terminals to base stations, and between peer nodes.

In the present specification and claims the word "a" or "an" preceding an element does not exclude the presence of a plurality of such elements. Further, the word "comprising" or "comprise" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method for transmitting a data signal including a plurality of data packets from a base station to a radio device, said method comprising acts of:
   subdividing each data packet into at least a first data sub-packet and a second data sub-packet; and
   transmitting the first data sub-packet on a first portion of total resources, having a first reuse factor, and the second data sub-packet on at least one second portion of total resources having a second reuse factor, said first reuse factor being different from said second reuse factor.

2. The method of claim 1, wherein the first data sub-packet and the second data sub-packet are transmitted simultaneously.

3. The method of claim 1, wherein each portion of total resources comprises at least one of the following: a set of at least one sub-carrier frequency, a set of at least one time-slot, or a set of at least one code.

4. The method of claim 1, wherein each portion of total resources is non-contiguous.

5. The method of claim 1, wherein each portion of total resources is contiguous.

6. The method of claim 1, wherein the first portion of total resources has a reuse factor of 1.

7. The method of claim 1, wherein the reuse factor is at least one of a frequency reuse factor, a time-slot reuse factor, and a code reuse factor.

8. The method of claim 1, wherein the first portion of total resources has a first size and the second portion of total resources has a second size, wherein the first and the second sizes are chosen so that the global link spectral efficiency equals $T=BT_1+(1-B)T_2$, $T_1$ being the link spectral efficiency of the first total resource portion, and $T_2$ being the link spectral efficiency of the second total resource portion.

9. The method of claim 8, wherein the value of B is between 0.4 and 0.6.

10. The method of claim 1, wherein said data signal is at least one of the following: a broadcast channel signal, a signaling channel signal, a control channel signal, a multicast signal.

11. The method of claim 1, further comprising an act of coding the data signal before subdividing into data packets.

12. The method of claim 1, further comprising an act of adding a redundancy check to the data signal before subdividing into data packets.

13. The method of claim 1, further the comprising an act of signaling a resource partition pattern to the receiver by the base station.

14. The method of claim 13, wherein the resource partition pattern is signaled by means of at least one of a pattern of pilot symbols, a pattern of a signal provided for synchronization, a cell identity and a base station identity.

15. A method for receiving a data signal including at least one data packet at a radio device, said method comprising acts of:
   receiving a first data sub-packet on a first portion of total resources having a first reuse factor;
   receiving a second data sub-packet on a second portion of total resources, said second portion of total resources having a second reuse factor, said first reuse factor being different from said second reuse factor; and
   combining the first and second data sub-packets into a data packet.

16. The method of claim 15, further comprising an act of receiving a resource partition pattern information.

17. The method of claim 15, further comprising an act of decoding each data packet after combining the sub-packets.

18. A base station for transmitting a data signal including at least one data packet, the base station comprising:
   means for subdividing each data packet into at least a first data sub-packet and a second data sub-packet;
   a first transmitter for transmitting the first data sub-packet on a first portion of total resources, having a first reuse factor, and
   a second transmitter for transmitting the second data sub-packet on at least one second portion of total resources having a second reuse factor, said first reuse factor being different from said second reuse factor.

19. The base station of claim 18, further comprising means for transmitting resource pattern partition information.

20. A radio device, for receiving a data signal including at least one data packet from a base station in a network, said radio device comprising:
   means for receiving a first signal including a first sub-packet on a first resource portion, said first resource portion having a first reuse factor; and
   means for receiving a second signal including a second sub-packet on a second resource portion, said second resource portion having a second reuse factor, the first reuse factor being different from the second reuse factor.

21. The radio device of claim 20, further comprising means for receiving a resource partition pattern information.

22. The radio device of claim 20, further comprising a decoder for decoding each data packet after combining the sub-packets.

* * * * *